United States Patent [19]

Baughman et al.

[11] Patent Number: 5,169,503
[45] Date of Patent: Dec. 8, 1992

[54] PROCESS FOR EXTRACTING METAL VALUES FROM ORES

[76] Inventors: David R. Baughman, 15941 W. 3rd Pl.; Ray V. Huff, 26 S. Holman, Apt. 3I; Steven G. Axen, 2191 Braun Dr., all of Golden, Colo. 80401

[21] Appl. No.: 210,986

[22] Filed: Jun. 24, 1988

[51] Int. Cl.$^5$ ............ C25C 1/00; C22B 3/00; C22B 11/00
[52] U.S. Cl. ............ 204/105 R; 423/38; 423/658.5; 423/40; 204/109
[58] Field of Search ............ 423/38, 40; 210/754; 75/118 R, 114, 101 R; 204/105 R, 109

[56] References Cited

U.S. PATENT DOCUMENTS

| | | | |
|---|---|---|---|
| 3,461,202 | 8/1969 | Robson | 210/754 |
| 4,131,454 | 12/1978 | Piret | 423/38 |
| 4,342,592 | 8/1982 | Lamb | 75/118 R |
| 4,439,235 | 3/1984 | Simpson | 75/118 R |
| 4,605,537 | 8/1986 | Touro | 75/118 R |
| 4,723,998 | 2/1988 | O'Neil | 75/118 R |

FOREIGN PATENT DOCUMENTS 1127832 6/1986 Japan ............ 423/40

*Primary Examiner*—Wayne Langel
*Assistant Examiner*—Steven Bos
*Attorney, Agent, or Firm*—Dorr, Carson, Sloan and Peterson

[57] ABSTRACT

Metal values are solubilized from ore by a lixiviant having a pH from 5 to 8, comprising an aqueous solution of a chloride salt and a hypochlorite salt. Cyanuric acid may be added to retard decomposition of the lixiviant. In one alternative embodiment, any remaining hypochlorite ions are then eliminated by adding hydrogen peroxide or a reducing agent to the pregnant lixiviant. Metal values are recovered by reduction using carbon, electrowinning, or other conventional techniques. In an alternative embodiment for extraction of gold or silver, the steps are combined by using finely ground ore containing sulfides or carbonaceous material to both reduce any remaining hypochlorite ions and precipitate the metal values from the lixiviant. The lixiviant can then be regenerated either by electrolysis or addition of hypochlorite salt.

29 Claims, No Drawings

PROCESS FOR EXTRACTING METAL VALUES FROM ORES

BACKGROUND OF THE INVENTION

1. Field of the Invention

The present invention relates generally to the field of hydrometallurgical extraction of precious metals from ores. More specifically, the present invention involves improvements to extraction of precious metals from ores by means of chlorinated brines, or brines containing hypochlorite salts.

2. Prior Art

Prior to introduction of the cyanide method in the late 1800s, gold ores were treated on an extensive scale by roasting and subsequent leaching with aqueous solutions of chlorine. The prior art also contains extensive references dealing with leaching of silver ores by chloride solutions. These processes are based on the well-known solubility of silver chloride in concentrated chloride solutions. Other prior art references of marginal relevance involve roasting of ores in the presence of chlorine to convert sulfides to chlorides.

U.S. Pat. No. 3,647,261 of Stenger, et al., is a general reference disclosing use of chlorine or alkali metal hypochlorite (e.g. NaOCl) in brine to solubilize silver for in situ leaching of ores. Other than claiming a desired range of oxidation potentials, Stenger provides little guidance concerning optimum pH, or concentrations of chloride, hypochlorite, or free chlorine for leaching precious metals. Precipitation of silver and copper from the pregnant lixiviant by hydrogen sulfide or sulfide salts is discussed (col. 4, lines 28–33).

U.S. Pat. No. 4,342,592 of Lamb is another general reference disclosing use of a hypochlorite/brine lixiviant with a pH from 8 to 13 to leach precious metal values from ores. Silver is recovered from the pregnant lixiviant by substitution with a more electropositive metal, such as zinc or iron (col. 3, lines 34–44).

In contrast, the present invention involves a number of improvements and refinements to the basic process not taught by any of the prior art references. In particular, the lixiviant disclosed herein has an essentially neutral pH from 5 to 8, and a hypochlorite concentration substantially less than any taught by the prior art as being effective. This results in substantial savings both in initial material costs, and in minimizing loss of hypochlorite in processing.

Hypochlorite loss may become a severe problem with in situ leaching or in large-scale heap leaching where a long period of time is required for the lixiviant to percolate through the ore. None of the prior art references address this problem. The present invention greatly reduces these losses by including cyanuric acid in the lixiviant to inhibit decomposition of the hypochlorite ions. Cyanuric acid and related salts are widely used to stabilize chlorine solutions used in bleaches, cleaning compounds, and swimming pools. However, the prior art references in these fields, such as U.S. Pat. No. 2,988,471 of Fuchs, et al. teach away from the present invention by observing that cyanuric acid inhibits chemical interaction between chlorine in solution and metal fixtures and pipes.

The present invention also differs from the prior art in adding an intermediate step to eliminate any remaining hypochlorite ions from the pregnant lixiviant prior to recovery of the metal values. Use of relatively inexpensive reducing agents or hydrogen peroxide for this purpose greatly simplifies the chemistry and reduces the cost of subsequent recovery of metal values from the pregnant lixiviant. One particularly promising result of this intermediate step is that simple carbon, such as charcoal or activated carbon, can then be used to reduce the metal value from solution. In the absence of this intermediate step, the carbon would be oxidized by the hypochlorite ions remaining in the lixiviant causing an economic loss of carbon. Further, hypochlorite remaining in the lixiviant greatly hinders the rate of deposition of precious metals. Alternatively, if the ore contains sulfides, a small portion of finely ground ore can be added to the pregnant lixiviant to reduce the metal values from solution. Neither alternative is taught nor suggested by the prior art.

SUMMARY OF THE INVENTION

The present invention is a process for extraction of metal values from ores. Metal values are first solubilized from the ore by a lixiviant having a pH between 5 and 8, comprising an aqueous solution of a chloride salt and a hypochlorite salt. Cyanuric acid may be added to retard decomposition of the lixiviant. In one alternative embodiment, any remaining hypochlorite ions are then eliminated by adding hydrogen peroxide or reducing agents to the pregnant lixiviant. Metal values are then recovered by reduction using carbon, electrowinning, or other conventional techniques. In an alternative embodiment for extraction of gold or silver, these last two steps are combined by using a finely ground ore containing sulfides or carbonaceous material to both reduce any remaining hypochlorite ions and precipitate the metal values from the lixiviant. The lixiviant can then be regenerated either by electrolysis or addition of hypochlorite salts.

A primary object of the present invention is to provide a more cost effective process for extraction of metal values from ores. Another object of the present invention is to avoid many of the environmental hazards and costs associated with conventional cyanide leaching. Yet another object of the present invention is to provide a process for leaching various types of ores that cannot be effectively treated using conventional cyanide technology, or either acid or alkaline chlorinated brines.

DETAILED DESCRIPTION OF THE INVENTION

The present invention is readily adaptable, with minor variations, to in situ leaching of ore, heap leaching of excavated ore, vat leaching, or agitation leaching. In each case, the first step is solubilization of the desired metal values from the ore by the lixiviant. This is accomplished by treating the ore with a lixiviant comprised of an aqueous solution of a chloride salt and a hypochlorite salt, and optionally cyanuric acid. In the preferred embodiment, sodium chloride and sodium hypochlorite are employed.

Experimentation has shown that the rate of extraction of precious metals from ore by chlorinated brine is largely a function of the concentration of free chlorine in solution. In turn, this is normally dependent upon the pH of the lixiviant. A lower pH results in a greater concentration of free chlorine, and more rapid solubilization of metal values. However, an acid lixiviant (pH less than 7) will react with any carbonates or other acid-consuming minerals in the ore, leading to excessive consumption of lixiviant. In addition, chlorine-producing solutions, such as sodium or potassium hypochlorite tend to decompose much more rapidly under acid conditions. (One type of conventional laundry bleach is an aqueous solution of sodium hypochlorite containing sufficient sodium hydroxide as a preservative to raise the pH of the solution to approximately 10 to 13 to inhibit decomposition.) To avoid such difficulties, the lixiviant in the present invention is essentially neutral with a pH from 5 to 8. However, as discussed below, cyanuric acid can be added to inhibit decomposition at lower pH.

Experimentation has also confirmed that the lixiviant must have a minimum oxidation potential (Eh) of approximately 500 mV, measured using a standard calomel electrode, to effectively solubilize gold from ore. Hypochlorite salt concentrations of as little as 100 ppm or less are sufficient to provide this minimum Eh. A range of concentrations from 5 to 3,000 ppm can be used. Chloride salt concentrations can range from 3% to saturation.

Addition of cyanuric acid to the lixiviant slows the rate of dissociation of free chlorine from solution and also slows the rate of decomposition of hypochlorite. Cyanuric acid appears to act as a buffering agent providing a fairly uniform concentration of free chlorine in solution over time. Cyanuric acid also has been found to have a favorable, but totally unexpected effect in regard to decomposition of hypochlorite. In the presence of cyanuric acid, hypochlorite losses decrease with lower pH. This is the opposite of what happens if cyanuric acid is absent, as discussed above. This effect is favorable due to the fact that the chemical kinetics for leaching are more favorable at lower pH because of the higher concentration of free chlorine in solution.

The prior art has noted that cyanuric acid tends to inhibit chemical reactions between chlorine in solution and metal fixtures (e.g. plumbing or swimming pool fixtures). Experimentation has confirmed that this effect exists to some degree. The presence of cyanuric acid will slightly decrease the reaction rate between the lixiviant and metal values in the ore. It should be stressed that cyanuric acid does not reduce the ultimate extraction of metal values from the ore, or limit metal loading of the pregnant lixiviant. Only the reaction rate is slowed. In the case of agitation leaching, cyanuric acid can be omitted or, if used, the processing time can be increased to compensate for the slower reaction rate. The primary advantage of adding cyanuric acid to the lixiviant is that the resulting decrease in reaction rate is more than offset by the increase in longevity of the lixiviant. This is a particular advantage for in situ leaching. In the case of in situ leaching, a number of wells are drilled from the surface of the earth into the ore body. Lixiviant is injected through a number of these wells and allowed to migrate through the ore body. The pregnant lixiviant is then withdrawn through a number of the wells for subsequent processing to recover the solubilized metal values. A major portion of the costs entailed in in situ leaching depend on the required number and spacing of these wells. In the absence of cyanuric acid, the hypochlorite solution can substantially decompose before the lixiviant is able to migrate through the ore formation. By adding cyanuric acid, the spacing between adjacent wells can be increased to account for the slower rate of decomposition of the lixiviant. Ore formations having lower permeability can also be economically treated using this process.

In the case of heap leaching, it is customary to spray fresh lixiviant over a large pile of ore and collect the pregnant lixiviant as it drains to the bottom of the heap. However, if the lixiviant decomposes before it has had an adequate time to both diffuse into the pieces of ore and migrate downward to the bottom of the heap, some portion of the metal values in the ore will not be recovered. This will continue to occur regardless of the length of time the heap is sprayed with lixiviant. Increasing the concentration of hypochlorite in solution will increase the longevity of the lixiviant, but will also increase the rate of loss of hypochlorite by decomposition. This can add substantial processing costs. By adding cyanuric acid to the lixiviant, it becomes possible to leach larger heaps of ore, or heaps containing less permeable ore without increasing the hypochlorite concentration.

Possible equivalents for cyanuric acid include chloramides, chloramines, chlorimines, chlorimides, chlorosulfonamides, chlorohydantoins, and ammelide. All of these classes of compounds act to some degree as buffers or reservoirs for free chlorine in solution, similar to cyanuric acid.

Following solubilization of the metal values from the ore, the next step is recovery of the metal values from the pregnant lixiviant. This can be accomplished by any number of means. One simple approach is to reduce both the hypochlorite and metals in solution with hydrogen sulfide. The metals are thereby precipitated from solution as sulfide compounds. Another approach conventionally known as electrowinning, is to pass the pregnant lixiviant through an electrolytic cell. Metals are reduced and precipitated at the cathode of the cell. Any remaining hypochlorite in the solution is also reduced at the cathode.

The preferred embodiment of the present invention separates this step into two. First, any remaining hypochlorite is eliminated from the pregnant lixiviant without precipitation of the metal values from solution. This is accomplished by adding an appropriate quantity of any of a number of inexpensive reducing agents (sulfur dioxide, or carbonaceous materials) or by adding hydrogen peroxide. Ongoing monitoring of the oxidation potential of the pregnant lixiviant leaving the ore is necessary to properly titrate the reducing agent. One alternative method of eliminating hypochlorite is to expose the lixiviant to ultra-violet light causing decomposition of the hypochlorite ions to oxygen and chloride ions. Another alternative is to pass the lixiviant over a catalyst, such as manganese dioxide or copper oxide, to decompose the hypochlorite ions. This reaction is accelerated by passing the lixiviant over a catalyst in a partial vacuum to draw off the oxygen gas generated by decomposition of the hypochlorite ions.

Following elimination of the hypochlorite, the lixiviant can then be more readily subject to any of a number of conventional techniques to extract the metal values, without having to deal with complications caused by the presence of oxidizing hypochlorite ions in the lixiviant. Conventional extraction using ion exchange resins, or replacement with more electropositive metals (e.g., zinc or iron) can be used to recover gold and silver from the pregnant lixiviant. Electrowinning by means of an electrolytic cell is also satisfactory. An iodide salt can be used to precipitate silver from the lixiviant.

In the preferred embodiment, carbon is used as a reducing agent to extract the metal value from solution. Suitably pure carbon for this purpose can be obtained at nominal cost in the form of petroleum coke or charcoal. It must be stressed that the chemical process of using carbon as a reducing agent to precipitate gold and silver from a chloride solution is entirely different from adsorption of gold-cyanide complexes by activated carbon, as practiced in conventional cyanide leaching technology. In the absence of the intermediate step of eliminating hypochlorite from the pregnant lixiviant, the carbon would be rapidly oxidized by the hypochlorite ions. Additionally, the rate of deposition of precious metals on the carbon is markedly improved when the pregnant lixiviant contains little or no hypochlorite. This faster reaction rate allows the use of lesser quantities of carbon to treat a given quantity of pregnant lixiviant. In conventional cyanide leaching technology, loadings of 200 ounces of gold per ton of activated carbon are considered optimal. In contrast, loadings in excess of 10% by weight can be achieved using the process described above.

Many ore deposits contain substantial quantities of pyrite (iron sulfide), other sulfides, or various carbonaceous materials. These act as reducing agents. The process described above can be modified for gold or silver by separating a very small percentage of the ore into a secondary process stream which is ground to a fine powder. Although pyrite acts as a reducing agent, pyrite crystals tend to form a thin skin of oxidized material that prevents further reaction. Grinding these crystals to powder allows complete chemical reaction between the pyrite and surrounding solutions. The ore in the primary process stream is treated with lixiviant to solubilize the metal values as outlined above. Metal values are then recovered from the primary process stream by adding a sufficient quantity of finely ground ore from the secondary process stream. The sulfides or carbonaceous material in the powdered ore act as reducing agents causing the metal values to precipitate from solution. This further reduces reagent costs in extracting metal values from the lixiviant. A further refinement to this process involves separation of the reducing material from the secondary process stream by flotation or gravity concentration. The concentrated reducing material is then ground to a fine powder and used as discussed above. The remaining ore in the secondary process stream is returned to the primary process stream.

Following recovery of the metal values, the final step is regeneration of the lixiviant for reuse. This is achieved either by addition of hypochlorite salt to the lixiviant, or by electrolysis of the lixiviant. In the latter case, hypochlorite ions are produced at the anode of the electrolytic cell by reaction between the chloride ions in solution and the oxygen generated at the anode. Further economies can be obtained by using a single electrolytic cell to both extract metal values and eliminate any remaining hypochlorite from the pregnant lixiviant at the cathode, and to then regenerate the lixiviant by creating hypochlorite ions at the anode. Experimentation has shown that simply placing both electrodes of the cell in the lixiviant will not work. Metal values are deposited at the cathode, but the hypochlorite ions produced at the anode are attracted to the cathode and eliminated. This problem is overcome by adding a semipermeable membrane between the anode and cathode to block migration of hypochlorite ions to the cathode. Another alternative is to treat the lixiviant as a continuous process stream, with the cathode located at a point upstream from the anode. Provided the lixiviant flow rate is sufficiently great, the fluid flow will prevent migration of hypochlorite ions upstream to the cathode. Following regeneration, the lixiviant is reused for further extraction of metal values, thereby completing the process loop.

As an optional pre-treatment step, in some situations involving unoxidized ores, it is advantageous to initially treat the ore with an aqueous solution having a relatively high hypochlorite concentration. This step serves to rapidly oxidize any reducing materials and coat any pyrite crystals in the ore that would otherwise react with the lixiviant. The ore is then treated with lixiviant as described above. The concentrations of hypochlorite in the lixiviant can also be gradually reduced over time as any remaining reducing material in the ore is gradually consumed.

The preceding discussion has been directed primarily toward a lixiviant containing sodium chloride and sodium hypochlorite due to the relatively inexpensive cost of these compounds. It appears that these compounds will perform satisfactorily in solubilizing gold and silver from most ores. However, any of a number of metal cations, such as potassium, lithium, calcium or magnesium, could be substituted for sodium in either or both of these salts. Similarly, another halogen (i.e., bromine or iodine) could be substituted for chlorine, in either or both of these salts. For example, bromide and iodide salts possess a greater complexing action for gold than chloride salts. Thus, lower concentrations of these salts are sufficient to provide the same complexing effect as a given concentration of chloride salt. Use of hypobromite or hypoiodite salts may increase the longevity of the lixiviant. However, these advantages appear to be heavily outweighed by the dramatically higher costs of these chemicals.

We claim:

1. A process for extracting metal values from ores, comprising:
   (a) solubilization of metal values from the ore, by treating the ore with a lixiviant comprising an aqueous solution of a chloride salt, a hypochlorite salt, and cyanuric acid; and
   (b) recovery of the metal values from the lixiviant.

2. The process of claim 1, wherein the lixiviant contains at least three percent of sodium chloride.

3. The process of claim 1, wherein the lixiviant comprises a concentration of sodium hypochlorites from 5 to 3,000 ppm.

4. The process of claim 1, wherein the lixiviant has a pH from 5 to 8.

5. The process of claim 1, further comprising subsequent regeneration of the lixiviant for reuse by addition of hypochlorite salt.

6. The process of claim 1, further comprising an initial step of treating the ore with an aqueous solution containing a hypochlorite salt to react with any unoxidized material in the ore.

7. The process of claim 1, wherein the recovery of metal values from the pregnant lixiviant is accomplished by electrowinning.

8. The process of claim 1, wherein the recovery of metal values from the pregnant lixiviant is accomplished by means of an electrolytic cell, wherein metal values are deposited from the lixiviant at the cathode and hypochlorite ions are added to the lixiviant at the anode.

9. A process for extracting metal values from ores, comprising:

(a) solubilization of metal values from the ore by treating the ore with a lixiviant comprising an aqueous solution of a chloride salt and a hypochlorite salt;
(b) substantial elimination of any remaining hypochlorite ions in the lixiviant without causing precipitation of metal values from the lixiviant; and
(c) recovery of metal values from the lixiviant.

10. The process of claim 9, wherein hypochlorite ions are eliminated from the lixiviant by adding a reducing agent.

11. The process of claim 9, wherein hypochlorite ions are eliminated from the lixiviant by adding hydrogen peroxide.

12. The process of claim 9, wherein hypochlorite ions are eliminated from the lixiviant by decomposition by exposure to ultra-violet light.

13. The process of claim 9, wherein hypochlorite ions are eliminated from the lixiviant by decomposition using a catalyst.

14. The process of claim 13, wherein the catalyst is manganese dioxide.

15. The process of claim 13, wherein the catalyst is copper oxide.

16. The process of claim 13, further comprising passing the lixiviant over a catalyst in a partial vacuum.

17. The process of claim 9, wherein recovery of silver from the pregnant lixiviant is accomplished by use of an iodide salt as a precipitant.

18. The process of claim 9, wherein recovery of gold from the pregnant lixiviant is accomplished by use of carbon as a precipitant.

19. The process of claim 18, wherein the carbon used as a precipitant is in the form of petroleum coke.

20. The process of claim 9, wherein the lixiviant has a pH ranging from 5 to 8.

21. The process of claim 9, wherein the recovery of metal values from the lixiviant is accomplished by use of an ion exchange resin.

22. The process of claim 9, further comprising an initial step of treating the ore with an aqueous solution containing a hypochlorite salt to react with any unoxidized material in the ore.

23. The process of claim 9, wherein the recovery of metal values from the pregnant lixiviant is accomplished by electrowinning.

24. The process of claim 9, wherein the lixiviant further comprises cyanuric acid.

25. The process of claim 9, further comprising subsequent regeneration of the lixiviant for reuse by addition of hypochlorite salt.

26. The process of claim 9, wherein recovery of metal values from the pregnant lixiviant is accomplished by deposit of the metal values at the cathode of an electrolytic cell, together with simultaneous regeneration of the lixiviant by creation of hypochlorite ions at the anode of the electrolytic cell.

27. A process for extracting metal values from ores also containing sulfides or carbonaceous materials, comprising:
(a) separation of a small percentage of the ore into a secondary process stream, which is then ground to a fine powder;
(b) solubilization of metal values from the remaining ore by treatment with a lixiviant comprising an aqueous solution of a chloride salt and a hypochlorite salt; and
(c) recovery of metal values from the pregnant lixiviant by adding a sufficient quantity of the finely ground ore to reduce the gold and any remaining hypochlorite ions in the lixiviant, thereby resulting in precipitation of gold from the lixiviant.

28. The process of claim 27, further comprising subsequent regeneration of the lixiviant for reuse by addition of hypochlorite salt.

29. The process of claim 27, wherein the lixiviant further comprises cyanuric acid.

* * * * *